United States Patent
Maes

(10) Patent No.: US 6,182,037 B1
(45) Date of Patent: *Jan. 30, 2001

(54) SPEAKER RECOGNITION OVER LARGE POPULATION WITH FAST AND DETAILED MATCHES

(75) Inventor: Stephane Herman Maes, Danbury, CT (US)

(73) Assignee: International Business Machines Corporation

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/851,982

(22) Filed: May 6, 1997

(51) Int. Cl.[7] .................................... G10L 17/00
(52) U.S. Cl. ............................ 704/247; 704/245
(58) Field of Search .................... 704/246, 247, 704/250, 249, 243, 245, 244

(56) References Cited

U.S. PATENT DOCUMENTS

| | | | |
|---|---|---|---|
| 3,673,331 | * 6/1972 | Hair et al. | 704/246 |
| 4,363,102 | 12/1982 | Holmgren et al. | |
| 4,716,593 | * 12/1987 | Hirai et al. | 704/247 |
| 4,720,863 | 1/1988 | Li et al. | |
| 4,827,518 | 5/1989 | Feustel et al. | |
| 4,947,436 | * 8/1990 | Greaves et al. | 704/206 |
| 5,073,939 | 12/1991 | Vensko et al. | |
| 5,121,428 | 6/1992 | Uchiyama et al. | |
| 5,167,004 | 11/1992 | Netsch et al. | |
| 5,189,727 | 2/1993 | Guerreri | |
| 5,216,720 | 6/1993 | Naik et al. | |
| 5,241,649 | 8/1993 | Niyada | |
| 5,271,088 | 12/1993 | Bahler | |
| 5,274,695 | 12/1993 | Green | |
| 5,339,385 | 8/1994 | Higgins | |
| 5,347,595 | * 9/1994 | Bokser | 382/225 |
| 5,384,833 | 1/1995 | Cameron | |
| 5,412,738 | 5/1995 | Brunelli et al. | |
| 5,414,755 | 5/1995 | Bahler et al. | |
| 5,522,012 | * 5/1996 | Mammone et al. | 704/260 |
| 5,537,488 | * 7/1996 | Menon et al. | 383/225 |

(List continued on next page.)

FOREIGN PATENT DOCUMENTS

| | | |
|---|---|---|
| 59-111699 | 6/1984 | (JP) . |
| 61-2599 | 1/1986 | (JP) . |
| 4-15700 | 1/1992 | (JP) . |

OTHER PUBLICATIONS

T. Matsui et al.; "A Study of Model and a Priori Threshold Updating in Speaker Verification"; Technical Report of the Institute of Electronics, Information & Communications Engineers; SP95–120(1996–01); pp 21–26.

(List continued on next page.)

Primary Examiner—David R. Hudspeth
Assistant Examiner—Harold Zintel
(74) Attorney, Agent, or Firm—McGuireWoods, LLP; Paul J. Otterstedt

(57) ABSTRACT

Fast and detailed match techniques for speaker recognition are combined into a hybrid system in which speakers are associated in groups when potential confusion is detected between a speaker being enrolled and a previously enrolled speaker. Thus the detailed match techniques are invoked only at the potential onset of saturation of the fast match technique while the detailed match is facilitated by limitation of comparisons to the group and the development of speaker-dependent models which principally function to distinguish between members of a group rather than to more fully characterize each speaker. Thus storage and computational requirements are limited and fast and accurate speaker recognition can be extended over populations of speakers which would degrade or saturate fast match systems and degrade performance of detailed match systems.

23 Claims, 2 Drawing Sheets

U.S. PATENT DOCUMENTS

| | | | |
|---|---|---|---|
| 5,608,840 | * 3/1997 | Tsuboka | 704/236 |
| 5,666,466 | * 9/1997 | Lin et al. | 704/246 |
| 5,675,704 | * 10/1997 | Juang et al. | 704/246 |
| 5,682,464 | * 10/1997 | Sejnoha | 704/238 |
| 5,689,616 | * 11/1997 | Li | 704/232 |
| 5,895,447 | * 4/1999 | Ittycheriah et al. | 704/231 |

OTHER PUBLICATIONS

Parsons "Voice and Speech Processing" 1987, McGraw–Hill, pp. 332–336.*

Bahl et al "A fast approximate acoustic match for large vocabulary speech recognition" IEEE Transactions, Jan. 1993, pp. 59–67.*

Rudasi, Text–independent talker identification using recurrent neural networks: J Acoust Soc Am Supp 1 v 87, pg s104, 1990.*

"Merriam–Webster collegiate dictionary" pp. 211 and 550, 1993.*

Rabiner "Digital processing of speech signals" p. 478, 1978.*

Parsons "Voice and Speech Processing" 1987, McGraw–Hill, p. 175.*

Yu et al "Speakerrecognition using hidden Markov models, dynamic time warping and vector quantisation", Oct. 1995, IEEE, 313–318.*

Rosenberg, Lee, and Soone, Sub–Word Unit Talker Verification Using Hidden Markov Models, 1990, AT&T Bell Laboratories, pp 269–272.

Herbert Gish, Robust Discrimination in Automatic Speaker Identification, BBN Systems and Technologies Corporation, pp 289–292.

Naik, Netsch and Doddington, Speaker Verification Over Long Distance Telephone Lines, Texas Instruments Inc., pp 524–527.

* cited by examiner

SPEAKER RECOGNITION OVER LARGE POPULATION WITH FAST AND DETAILED MATCHES

BACKGROUND OF THE INVENTION

1. Field of the Invention

The present invention generally relates to speaker identification and verification in speech recognition systems and, more particularly, to rapid and text-independent speaker identification and verification over a large population of enrolled speakers.

2. Description of the Prior Art

Many electronic devices require input from a user in order to convey to the device particular information required to determine or perform a desired function or, in a trivially simple case, when a desired function is to be performed as would be indicated by, for example, activation of an on/off switch. When multiple different inputs are possible, a keyboard comprising an array of two or more switches has been the input device of choice in recent years.

However, keyboards of any type have inherent disadvantages. Most evidently, keyboards include a plurality of distributed actuable areas, each generally including moving parts subject to wear and damage and which must be sized to be actuated by a portion of the body unless a stylus or other separate mechanical expedient is employed. Accordingly, in many types of devices, such as input panels for security systems and electronic calculators, the size of the device is often determined by the dimensions of the keypad rather than the electronic contents of the housing. Additionally, numerous keystrokes may be required (e.g. to specify an operation, enter a security code, personal identification number (PIN), etc.) which slows operation and increases the possibility that erroneous actuation may occur. Therefore, use of a keyboard or other manually manipulated input structure requires action which is not optimally natural or expeditious for the user.

In an effort to provide a more naturally usable, convenient and rapid interface and to increase the capabilities thereof, numerous approaches to voice or sound detection and recognition systems have been proposed and implemented with some degree of success. Additionally, such systems could theoretically have the capability of matching utterances of a user against utterances of enrolled speakers for granting or denying access to resources of the device or system, identifying enrolled speakers or calling customized command libraries in accordance with speaker identity in a manner which may be relatively transparent and convenient to the user.

However, large systems including large resources are likely to have a large number of potential users and thus require massive amounts of storage and processing overhead to recognize speakers when the population of enrolled speakers becomes large. Saturation of the performance of speaker recognition systems will occur for simple and fast systems designed to quickly discriminate among different speakers when the size of the speaker population increases. Performance of most speaker-dependent (e.g. performing decoding of the utterance and aligning on the decoded script models such as hidden Markov models (HMM) adapted to the different speakers, the models presenting the highest likelihood of correct decoding identifying the speaker, and which may be text-dependent or text-independent) systems also degrades over large speaker populations but the tendency toward saturation and performance degradation is encountered over smaller populations with fast, simple systems which discriminate between speakers based on smaller amounts of information and thus tend to return ambiguous results when data for larger populations results in smaller differences between instances of data.

As an illustration, text-independent systems such as frame-by-frame feature clustering and classification may be considered as a fast match technique for speaker or speaker class identification. However, the numbers of speaker classes and the number of speakers in each class that can be handled with practical amounts of processing overhead in acceptable response times is limited. (In other words, while frame-by-frame classifiers require relatively small amounts of data for each enrolled speaker and less processing time for limited numbers of speakers, their discrimination power is correspondingly limited and becomes severely compromised as the distinctiveness of the speaker models (each containing relatively less information than in speaker-dependent systems) is reduced by increasing numbers of models. It can be readily understood that any approach which seeks to reduce information (stored and/or processed) concerning speaker utterances may compromise the ability of the system to discriminate individual enrolled users as the population of users becomes large. At some size of the speaker population, the speaker recognition system or engine is no longer able to discriminate between some speakers. This condition is known as saturation.

On the other hand, more complex systems which use speaker dependent model-based decoders which are adapted to individual speakers to provide speaker recognition must run the models in parallel or sequentially to accomplish speaker recognition and therefore are extremely slow and require large amounts of memory and processor time. Additionally, such models are difficult to train and adapt since they typically require a large amount of data to form the model.

Some reduction in storage requirements has been achieved in template matching systems which are also text-dependent as well as speaker-dependent by reliance on particular utterances of each enrolled speaker which are specific to the speaker identification and/or verification function. However, such arrangements, by their nature, cannot be made transparent to the user; requiring a relatively lengthy enrollment and initial recognition (e.g. logon) procedure and more or less periodic interruption of use of the system for verification. Further and, perhaps, more importantly, such systems are more sensitive to variations of the utterances of each speaker ("intra-speaker" variations) such as may occur through aging, fatigue, illness, stress, prosody, psychological state and other conditions of each speaker.

More specifically, speaker-dependent speech recognizers build a model for each speaker during an enrollment phase of operation. Thereafter, a speaker and the utterance is recognized by the model which produces the largest likelihood or lowest error rate. Enough data is required to adapt each model to a unique speaker for all utterances to be recognized. For this reason, most speaker-dependent systems are also text-dependent and template matching is often used to reduce the amount of data to be stored in each model. Alternatively, systems using, for example, hidden Markov models (HMM) or similar statistical models usually involve the introduction of cohort models based on a group of speakers to be able to reject speakers which are too improbable.

Cohort models allow the introduction of confidence measures based on competing likelihoods of speaker identity and are very difficult to build correctly, especially in increasing populations due to the number of similarities which may exist between utterances of different speakers as the population of enrolled speakers increases. For that reason, cohort models can be significant sources of potential error. Enrollment of new speakers is also complicated since it requires extraction of new cohorts and the development or modification of corresponding cohort models.

Template matching, in particular, does not allow the straightforward introduction of cohorts. Templates are usually the original waveforms of user utterances used for enrollment and the number of templates for each utterance is limited, as a practical matter, by the time which can reasonably be made available for the matching process. On the other hand, coverage of intra-speaker variations is limited by the number of templates which may be acquired or used for each utterance to be recognized and acceptable levels of coverage of intra-speaker variations becomes prohibitive as the user population becomes large. Development of cohorts, particularly to reduce data or simplify search strategies tends to mask intra-speaker variation while being complicated thereby.

Further, template matching becomes less discriminating as the user population increases since the definition of distance measures between templates becomes more critical and complicates search strategies. Also, conceptually, template matching emphasizes the evolution of a dynamic (e.g. change in waveform over time) in the utterance and reproduction of that dynamic while that dynamic is particularly variable with condition of the speaker.

Accordingly, at the present state of the art, large speaker populations render text-independent, fast speaker recognition systems less suitable for use and, at some size of speaker population, render them ineffective, requiring slower, storage and processor intensive systems to be employed while degrading their performance as well. There has been no system available which allows maintaining of performance of speaker recognition comparable to fast, simple systems or increasing their discrimination power while limiting computational and memory requirements and avoiding saturation as the enrolled speaker population becomes large.

SUMMARY OF THE INVENTION

It is therefore an object of the present invention to provide a system for rapidly discriminating individual enrolled users among a large population of enrolled users which is text-independent and transparent to the user after enrollment.

It is another object of the invention to provide a system for speaker identification and verification among a large population of enrolled users and having a simple, rapid, transparent and text-independent enrollment procedure.

It is a further object of the invention to improve the processing of speaker and cohort models during speech decoding and speaker recognition.

It is yet another object of the invention to provide fast speaker recognition over a large population of speakers without reduction of accuracy.

In order to accomplish these and other objects of the invention, a method for identification of speakers is provided including the steps of forming groups of enrolled speakers, identifying a speaker or a group of speakers among the groups of enrolled speakers which is most likely to include the speaker of a particular utterance, and matching the utterance against speaker-dependent models within the group of speakers to determine identity of a speaker of the utterance.

In accordance with another aspect of the invention, a speaker recognition apparatus is provided comprising a vector quantizer for sampling frames of an utterance and determining a most likely speaker of an utterance, including an arrangement for detecting potential confusion between a speaker of the utterance with one or more previously enrolled speakers, and an arrangement for developing a speaker-dependent model for distinguishing between the speaker and the previously enrolled speaker in response upon detection of potential confusion between them.

The invention utilize a fast match process and a detailed match, if needed, in sequence so that the detailed match is implemented at or before the onset of saturation of the fast match process by an increasing population of users. The detailed match is accelerated by grouping of users in response to detection of potential confusion and limits storage by developing models directed to distinguishing between members of a group while facilitating and accelerating the detailed match process by limiting the number of candidate speakers or groups.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
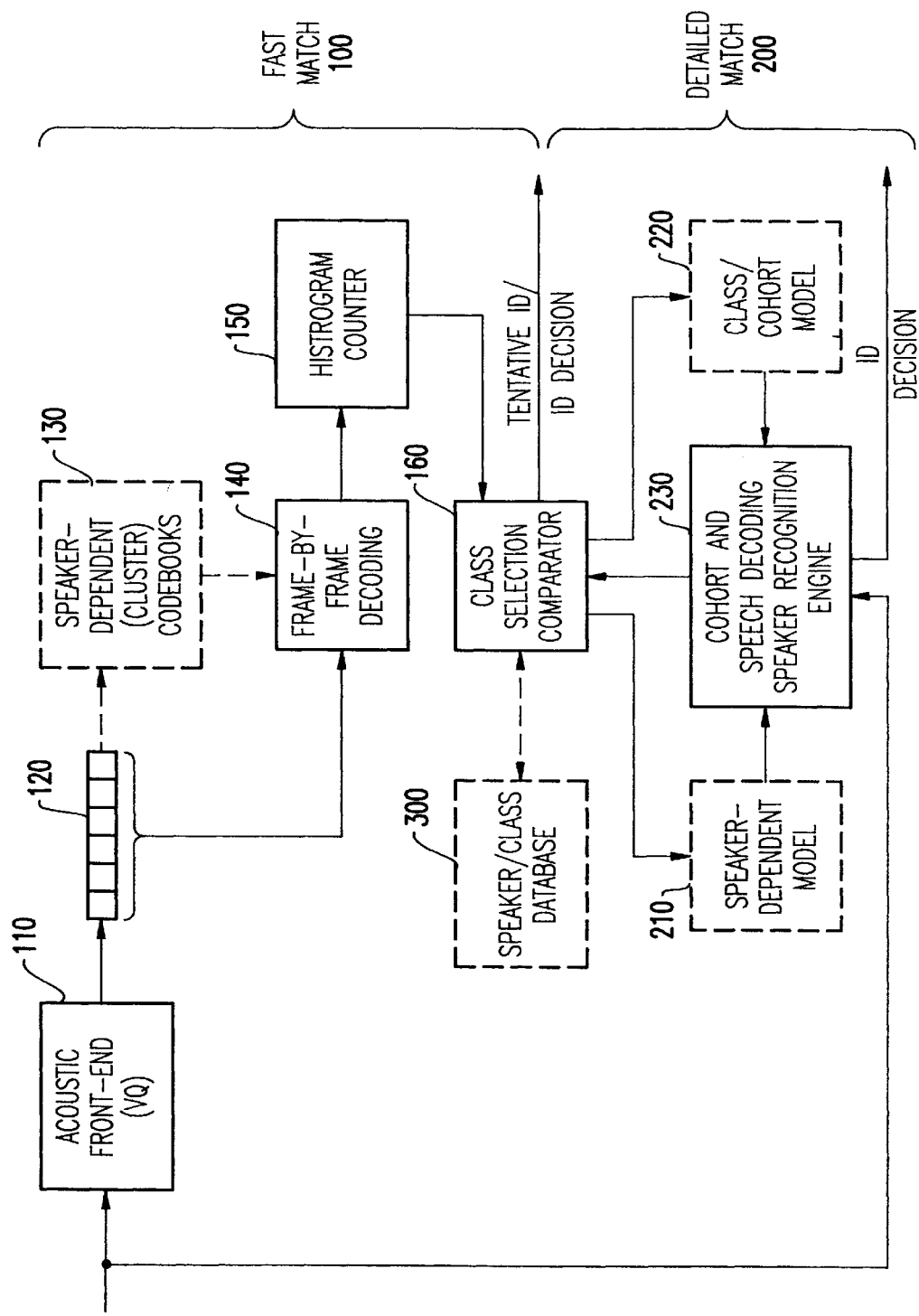
FIG. 1 is a block diagram/flow chart illustrating the architecture and operation of a preferred form of the invention.

Referring now to the drawings, and more particularly to FIG. 1, there is shown a high level block diagram of a preferred form of the invention. FIG. 1 can also be understood as a flow chart illustrating the operation of the invention as will be discussed below. It should also be understood that the architecture and operation of the system as illustrated in FIG. 1 may be implemented as a special purpose data processor or, preferably, by a suitably programmed general purpose data processor, in which latter case, the illustrated functional elements will be configured therein during initialization or as needed during operation of the program as is well-understood in the art.

Initially, it should be appreciated that the configuration of the preferred form of the invention is generally divided into two sections and thus is well-described as a hybrid system. The upper portion 100, as illustrated, is a feature vector based fast match speaker recognition/classification system which is text-independent. The lower portion 200, as illustrated, is a detailed match arrangement based on speaker models 210 or cohort models 220 and may be text-dependent or text-independent while the upper portion 100 is inherently text-independent. It should be understood that the overall system in accordance with the invention may be text-dependent or text-independent in accordance with the implementation chosen for lower, detailed match portion 200.

These portions of the system architecture represent sequential stages of processing with the detailed match being conducted only when a decision cannot be made by the first, fast match stage while, even if unsuccessful, the first stage enhances performance of the second stage by automatic selection of speaker or cohort models for the detailed match as well as automatically selecting them. The selection of cohorts, while needed for the detailed match processing also accelerates the fast match processes in some cases as will be discussed below.

More specifically, an acoustic front-end 110 which is, itself, well-understood in the art, is used to sample utterances in an overlapping fashion and to extract feature vectors 120 therefrom, preferably as MEL cepstra, delta and delta-delta coefficients along with normalized log-energies. (Log-energies and cepstra $C_O$ should not be included.) In combination therewith, a vector quantizer clusters the feature vectors produced from the enrollment data as means and variances thereof for efficient storage as well as to quantize the feature vectors derived from utterances (test data) to be recognized.

Such feature vectors are preferably computed on overlapping 25–30 msec. frames with shifts of 10 msec. Physiologically related (e.g. characterizing vocal tract signatures such as resonances) MEL cepstra, delta and delta-delta feature vectors are preferred as feature vectors for efficiency and effectiveness of speaker identification or verification although other known types of feature vectors could be used. Such feature vectors and others, such as LPC cepstra, are usually thirty-nine dimension vectors, as is well-understood in the art. The resulting feature vectors are clustered into about sixty-five codewords (the number is not critical to practice of the invention) in accordance with a Mahalanobis-distance. In practice, the variances of each coordinate of the feature vectors can be empirically determined over a representative set of speakers and the measure of association of a vector relative to a codeword is a weighted Euclidean distance with the weight being the inverse of the associated variances. The set of codewords thus derived constitute a codebook 130 for each enrolled speaker.

It should be noted that only one codebook is required for each enrolled speaker. Therefore, storage requirements (e.g. memory 130) for the fast match section of the invention are quite small and no complex model of a complete utterance is required. Any new speaker enrollment requires only the addition of an additional codebook while leaving other codebooks of previously enrolled speakers unaffected, reducing enrollment complexity. Also, since the memory 130 consists of similarly organized codebooks, efficient hierarchical (multi-resolution) approaches to searching can be implemented as the number of enrolled users (and associated codebooks) becomes large.

Figure 2A:
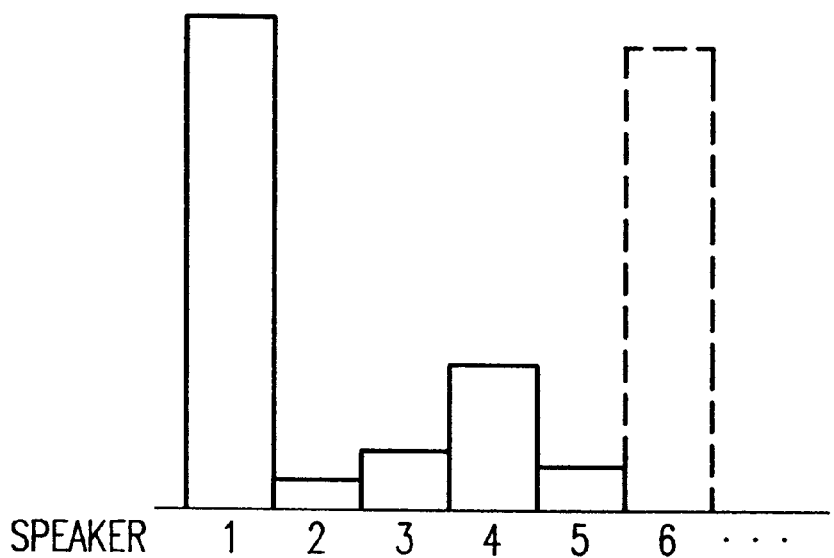
FIGS. 2A and 2B are graphical representation of histogram processing in accordance with the invention.

Thereafter, test information is decoded frame-by-frame against the codebooks by decoder 140. Each frame of test data which provides an arbitrarily close match to a codeword provides an identification of the codebook which contains it. The frames which thus identify a particular codebook are counted in accordance with the codebook identified by each frame by counter 150 and a histogram is developed, as illustrated for speakers 1–5 of FIG. 2A. Generally, one codebook will emerge as being identified by a statistically significant or dominant number of frames after a few seconds of arbitrary speech and the speaker (e.g. speaker 1 of FIG. 2A) is thus identified, as preferably detected by a comparator arrangement 160. The divergence of histogram peak magnitudes also provides a direct measure of confidence level of the speaker identification. If two or more peaks are of similar (not statistically significant) magnitude, further processing as will be described below can be performed for a detailed match 200 for speaker identification.

However, in accordance with the invention, the feature vectors are also decoded against existing codebooks during enrollment by developing a histogram as described above. If the speaker being enrolled (e.g. speaker 6 of FIG. 2A) is confused with an existing enrolled speaker by developing a histogram peak magnitude which is similar to that of a previously enrolled speaker (e.g. potentially identifying a new speaker as a previously enrolled speaker), a class is formed in database 300 (in this case containing speakers 1 and 6) responsive to comparator 160 including the speakers whose utterances produce similar feature vectors. Data from the different speakers is then used to adapt speaker-dependent models capable of distinguishing between them and the models stored in database 300.

It should be appreciated that detecting potential confusion is tantamount to the onset of saturation of the fast match system so that the fast match system can be utilized to the full extent of its discrimination powers and detailed matching is performed only when beyond the capability of the fast match portion of the invention (unless intentionally limited by conservative design such as imposition of a low statistical threshold for potential confusion). However, such onset of saturation is detected during enrollment and, in this sense, the configuration of the system in accordance with the invention is adaptive to supplement the fast match portion, when necessary, by a detailed matching process. The detailed match is, itself, facilitated by limiting the scope of comparisons to members of a group and the adaptation of speaker-dependent models optimized or at least adapted to make the necessary distinctions between members of the group. The number of groups and number of speakers per group will always be minimized since groups are generated and members added to a group only when potential confusion is detected.

Of course, development and adaptation of such speaker-dependent models requires substantially more data to be collected for each such speaker. However, such data can be collected during somewhat extended enrollment for the speaker being enrolled (speaker 6) and later for the speakers (e.g. speaker 1) with which the newly enrolled speaker is confused during their next use of the system. It should also be noted that the development of classes automatically selects or defines cohorts from which cohort models can be developed and provides for collection and storage of additional data only when necessary as the enrolled user population increases.

It should also be noted that after at least one class is defined and created as described above, test data which results in confusion between speakers, as a histogram is developed of counter 150 can be compared against the class or classes, if any, to which each candidate speaker is assigned. This comparison can often provide useable results after only a few seconds of speech or even a few hundred frames. If, for example, during verification (e.g. the periodic testing of speech to be that of a previously identified speaker) a class is identified other than the class to which the previously identified speaker belongs, the verification can be considered to have failed. This possibility is particularly useful in denying access to a user of a secure system when verification fails after access is granted upon initial identification. For identification, as soon as two or a limited number of speakers dominates, only the speakers in the one or two classes corresponding to the dominating speakers need be considered further, Both of these decisions, taken after only a relatively few seconds or small number of frames greatly accelerate the speaker recognition process.

Figure 2B:
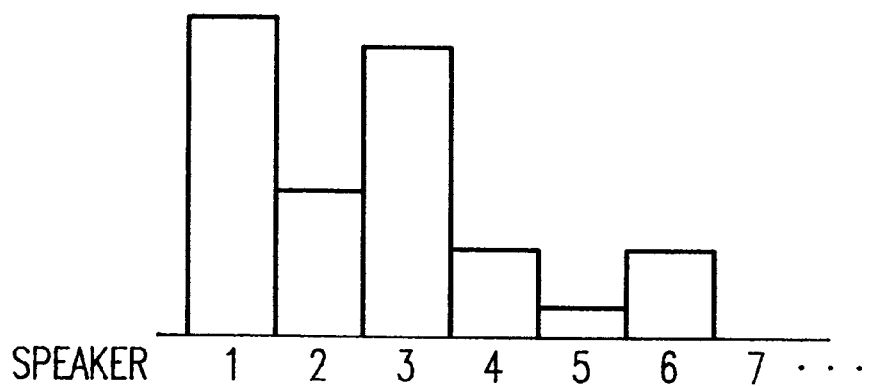

Other decisions can also be made in a manner which facilitates fast and/or detailed match processing and may allow a possible or at least tentative identification of the speaker to be made by the fast match processing alone. For example, as illustrated in FIG. 2B where comparable counts are developed for speakers 1 and 3, if the candidate speakers do not belong to the same class (e.g. speaker 3, when enrolled, did not cause creation of a class with speaker 1), the speaker associated with the greater histogram peak can usually be correctly selected or tentatively identified (or speakers not classed with other speakers between which there is confusion can be eliminated) by the fast match process on the basis of a relatively few frames since it can be assumed that a divergence of magnitude of the histogram peaks would later develop based on further speech. This feature of the invention provides acceleration of the speaker recognition process by the fast match section 100 of the invention and allows a speaker dependent model 210 to be called for use by the cohort and speech decoder 230 from database 300 for speaker identity verification and speech recognition.

If the speakers are in the same class as detected by comparator 160 accessing database 300, the speaker dependent models of all cohorts of the single class can be called at an early point in time in order to distinguish between them which is also done by the speaker recognition engine included with cohort and speech decoder 230. It should be noted that this selection of a class limits the data processed to that which is necessary for discrimination between the speakers which are, in fact, confused by fast match section 100 and results in reduction of processing time and overhead as well as storage requirements for the speaker-dependent models. Cohorts are needed only when confusion actually occurs, reducing the total storage requirements. Further, the cohort model 220 can be used for speech decoding at an earlier time since an ambiguous decoding of an utterance is unlikely within cohorts.

The speech decoding engine 230 preferably utilizes hidden Markov models (HMMs) with continuous density Gaussian mixtures to model the output distribution (i.e. the probability density function to observe a given acoustic vector at a given arc of the HMM model). A set of maximum-a-posteriori (MAP) estimated models, or adapted by other speaker-dependent algorithms like re-training, adaptation by correlation (ABC), maximum likelihood linear regression (MLLR) or clustered transformation (CT), are loaded for different pre-loaded speakers. During enrollment, the utterances are decoded with a gender-independent system. Then each pre-loaded system is used to compute likelihoods for a same alignment. The N-best speakers are extracted and linear transforms are computed to map each of the selected pre-loaded speaker models closer to the enrolled speaker. Using this data, new Gaussians are built for the new speakers. Unobserved Gaussians are preferably adapted using the ABC algorithm. During speaker recognition, the likelihoods produced by the speaker and its cohorts are compared for a same alignment produced by a speaker independent model.

While this process may be computationally intensive, the enrollment data used to distinguish between cohorts may, in practice, be quite limited particularly if made text-dependent or text-prompted. In these latter cases, if the fast match identification or verification is not succesful, identification or verification may be carried out in a text-dependent fashion. However, the computation and comparisons of the alignments described above allow text-independence for identification or verification, if desired. Thus, text-independence is achieved for the majority of identification and verification operations by the fast match processing while minimizing storage requirements and computational overhead to very low levels in the detailed match stage 200 which is thus accelerated, as described above.

In view of the foregoing, the hybrid system of the invention combining fast and detailed match sections provides very rapid speaker identification with little, if any, increase in storage requirements, since the processing of the detailed match stage generally allows reduction of storage requirement by more than enough to compensate for storage of codebooks, largely because the speaker-dependent models may be built principally for distinguishing between speakers of a group rather than more fully characterizing the speech of each speaker. Enrollment, identification and verification of speaker identity are conducted in a manner transparent to the user except to the extent text-dependence may be used to limit storage for a small number of discriminations between speakers. The fast match and detailed match sections of the hybrid arrangement accelerate operation of each other while providing for automatic handling of cohorts and supporting efficient search strategies while processing overhead is limited by reducing the amount of data processed in each section supplemented by efficient search strategies. These benefits are maintained as the user population becomes very large.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for performing speaker recognition in accordance with a computer system, said computer system including a storage unit for storing a plurality of codebooks each of which corresponds to one of a plurality of speakers, said method comprising:

allocating said plurality of speakers into groups of speakers;

performing a text-independent, fast-match speaker recognition process in accordance with steps that include:
    (a) comparing an input speech signal with a portion of said plurality of codebooks stored in said storage unit, wherein step (a) includes:
      (1) splitting said input speech signal into a plurality of frames,
      (2) for each frame:
        (i) deriving at least one feature vector from said input speech signal,
        (ii) comparing the at least one feature vector in each frame with codewords in said portion of said plurality of codebooks, the codewords in each codebook being formed from feature vectors derived from test data previously input for a corresponding one of said speakers,
      (3) counting frames which correspond to each of said plurality of codebooks, and
      (4) providing an indication of how closely each of said codebooks match said input speech signal based on said frame counting step, and
    (b) identifying a predetermined number of said portion of said plurality of codebooks which best match said input speech signal; and
  performing a detailed-match speaker recognition process in accordance with steps that include:
    (c) identifying groups into which the speakers identified in step (b) belong;
    (d) comparing said input speech signal only with models corresponding to speakers in said groups identified in step (c); and (e) identifying the speaker of said input speech signal based on an outcome of comparing step (d).

2. A method as recited in claim 1, further comprising:
verifying, at a time subsequent to identification of said speaker in step (e), that the speaker of said input speech signal is likely to be a speaker previously identified by said identifying step (e).

3. A method as recited in claim 2, wherein said verification step includes the step of
determining that the speaker of said input speech signal is in a common group with said previously identified speaker.

4. A method as recited in claim 3, including the further step of
repeating said identifying step to complete said verification step.

5. A method as recited in claim 1, wherein said allecating step includes the further steps of clustering feature vectors representing utterances of a new speaker during enrollment to form a codebook for said new speaker,
decoding said feature vectors against codebooks for previously enrolled speakers,
associating said new speaker and a previously enrolled speaker in a group when potential confusion is detected between said new speaker and said previously enrolled speaker.

6. A method as recited in claim 5, including the further step of
developing a speaker-dependent model capable of distinguishing between speakers associated in a group.

7. A method as recited in claim 1, wherein said step of identifying said speaker includes the further step of
determining at least two candidate speakers for recognition, and
selecting a more likely of the candidate speakers if the candidate speakers are not associated in a group.

8. A method as recited in claim 1, wherein said step of identifying said speaker includes the further step of
determining at least three candidate speakers for recognition, at least two and less than all of said at least three candidate speakers being associated in a group, and
eliminating a candidate speaker of said at least three candidate speakers which is not associated in said group.

9. A method as recited in claim 1, wherein said first speaker recognition process and said second speaker recognition process are performed hierarchically.

10. A method as recited in claim 9, wherein said identifying step is performed by vector clustering.

11. A method as recited in claim 1, including the further step of
verifying that the speaker of a further input speech signal is likely to be a speaker identified by said identifying step (e) by repeating at least said second speaker recognition process.

12. A method as recited in claim 1, wherein identifying step is text-dependent.

13. A method as recited in claim 1, including the further step of
matching the input speed signal against speaker-dependent models within said input speed signal against speaker-dependent identity of a speaker of said input speed signal.

14. A method as recited in claim 13, wherein said second speech recognition process includes comparing said input speech signal using a trained, speaker-dependent model and identifying a speaker as the speaker on whom the most likely model is trained.

15. A method as recited in claim 1, wherein said models are one of speaker-dependent models or cohort models.

16. A method as recited in claim 1, wherein said second speaker recognition process is text-dependent.

17. A method as recited in claim 1, wherein said second speaker recognition process is text-independent.

18. A method as recited in claim 1, further comprising:
performing a verification step to determine whether at least one subsequent input speech signal is from the speaker identified in step (e).

19. A method as recited in claim 18, further comprising:
determining that said verification step failed when said performing step identifies that said subsequent input speech signal is from a speaker in a different group from the speaker identified in step (e).

20. A method as recited in claim 19, further comprising:
preventing the speaker in said different group from accessing a secure system if said verification step is determined to have failed.

21. A method as recited in claim 1, wherein if the speakers identified in step (b) belong to a same group, said second speaker recognition process includes:
using speaker-dependent models of all cohorts of the same group to determine the speaker of said input speech signal.

22. A method as recited in claim 1, wherein said allocating step includes:
enrolling at least one of said plurality of speakers in accordance with steps that include:
comparing a test speech signal of said speaker to be enrolled with codebooks of already-enrolled speakers,
identifying codebooks of already-enrolled speakers that are a close match with the test speech signal of said speaker to be enrolled, and
defining a first class of similar speakers containing said speaker to be enrolled and said already-enrolled speaker that are a close match.

23. A method as recited in claim 22, wherein said allocating step includes:
adapting at least one of a model developed for said speaker to be enrolled and models of said already-enrolled speakers that are a close match to increase a discrimination therebetween.

* * * * *